April 10, 1934.  J. H. McNABB  1,954,392
SOUND REPRODUCING APPARATUS
Filed May 8, 1931  3 Sheets-Sheet 1

Inventor
Joseph H. McNabb
By: Miehle & Miehle
Attys.

April 10, 1934.   J. H. McNABB   1,954,392
SOUND REPRODUCING APPARATUS
Filed May 8, 1931   3 Sheets-Sheet 2

Inventor:
Joseph H. McNabb
By: Miehle & Miehle,
Attys

April 10, 1934.  J. H. McNABB  1,954,392
SOUND REPRODUCING APPARATUS
Filed May 8, 1931  3 Sheets-Sheet 3
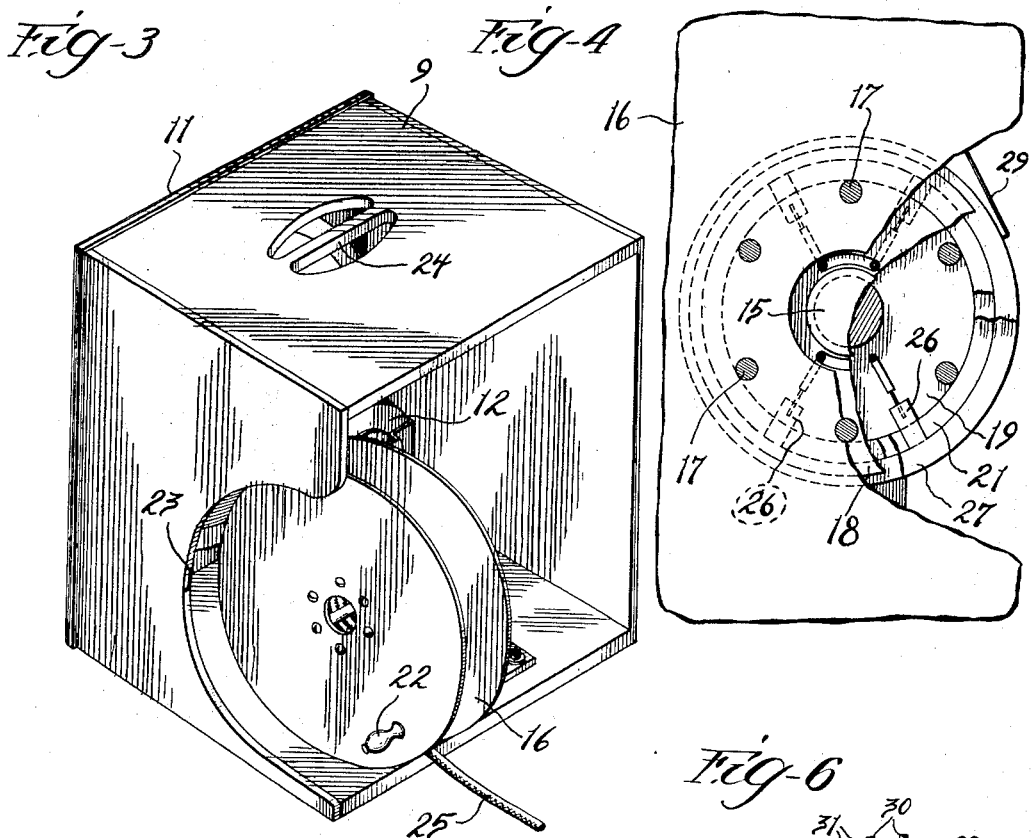
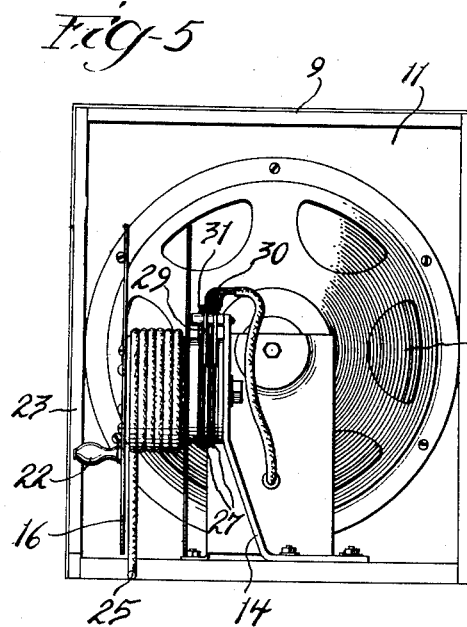
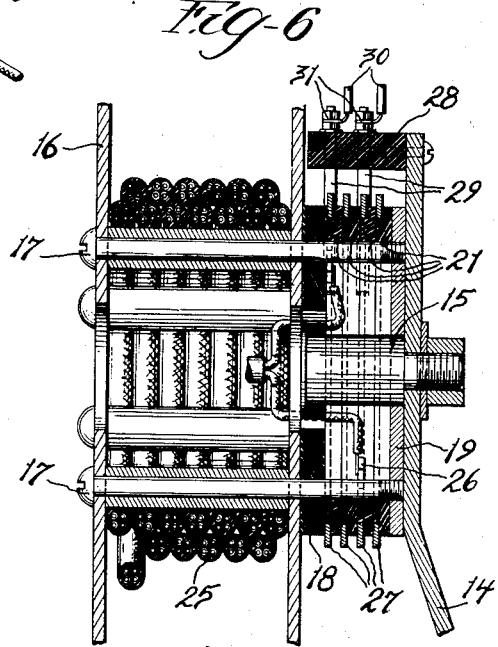
Inventor:
Joseph H. McNabb
By: Michl & Michl
Attys Patented Apr. 10, 1934

1,954,392

UNITED STATES PATENT OFFICE 1,954,392

SOUND REPRODUCING APPARATUS

Joseph H. McNabb, Winnetka, Ill., assignor to The Bell & Howell Company, Chicago, Ill., a corporation of Illinois Application May 8, 1931, Serial No. 535,939

2 Claims. (Cl. 179—100.11)

My invention has particular relation to apparatus for the production of sound accompanied motion pictures adapted for home use, although not limited to this use alone.

The general object of the invention resides in the provision of means whereby a portable electro-responsive sound reproducer or "loud speaker" may be placed at a desired distance from an associated producer of sound modulated electric energy, such as a radio receiver or an electric phonograph, with a view toward convenience and desirability in the temporary placement of the reproducer at a distance from the reproducer or the placement of the producer in adjacent relation with the producer for purposes as will hereinafter appear.

In the preferred embodiment of the invention, a cabinet is contemplated which contains a motion picture projector, an associated electric phonograph operated in synchronism with the projector, and which preferably also contains a radio receiver, and in which the reproducer, serving both the phonograph and receiver, is receivable in an opening of the cabinet and removable therefrom, an extension energizing cable serving to connect the producer in the cabinet and the reproducer, so that the reproducer may be used either while in the cabinet or while placed a desired distance therefrom. Accordingly, when the apparatus is used for the production of sound accompanied motion pictures, the reproducer is placed adjacent a projection screen spaced from the cabinet, and when only the phonograph or the radio receiver is used or when the apparatus is not in use, the reproducer is compactly placed in the cabinet, with obvious advantage particularly in home use.

With the above object in view my invention consists in certain features of novelty in the construction, combination, and arrangement of parts by which the said object and certain other objects, hereinafter appearing, are effected, all as fully described with reference to the accompanying drawings and more particularly pointed out in the appended claims.

In the said drawings—

Figure 3 is a perspective view of the reproducer or "loud speaker" unit of the apparatus;

Figure 4 is a partial side elevation of the extension energizing cable reel structure of the device, hereinafter described, with parts broken away;

Figure 5 is a rear elevation of the reproducer or "loud speaker" unit of the apparatus; and Figure 6 is a partial axial section of the aforesaid cable reel structure.

Like characters of reference indicate like parts in the several views.

Figure 1:
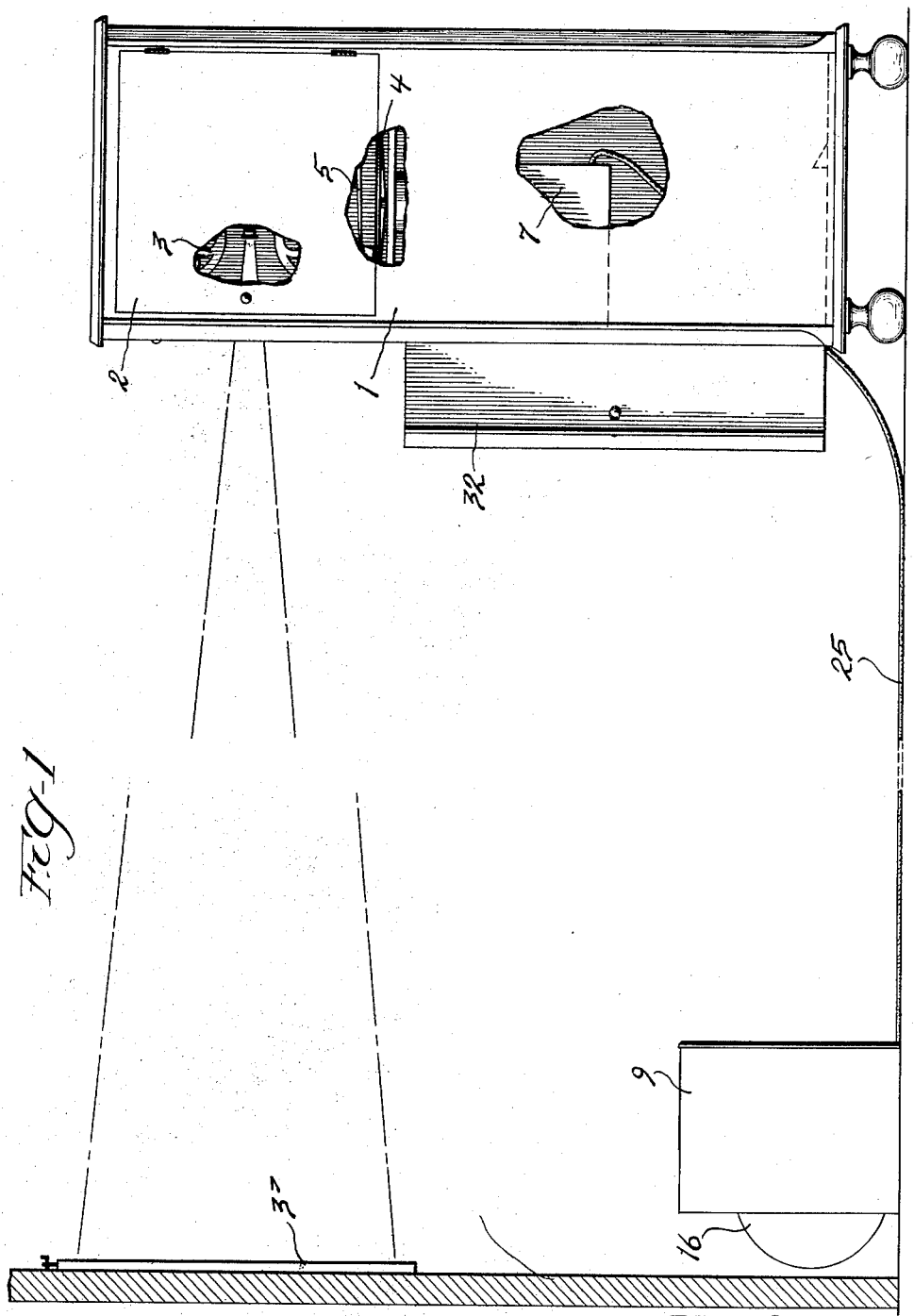
Figure 1 is a side elevation of apparatus embodying my invention and arranged for the production of sound accompanied motion pictures.
Figure 2:
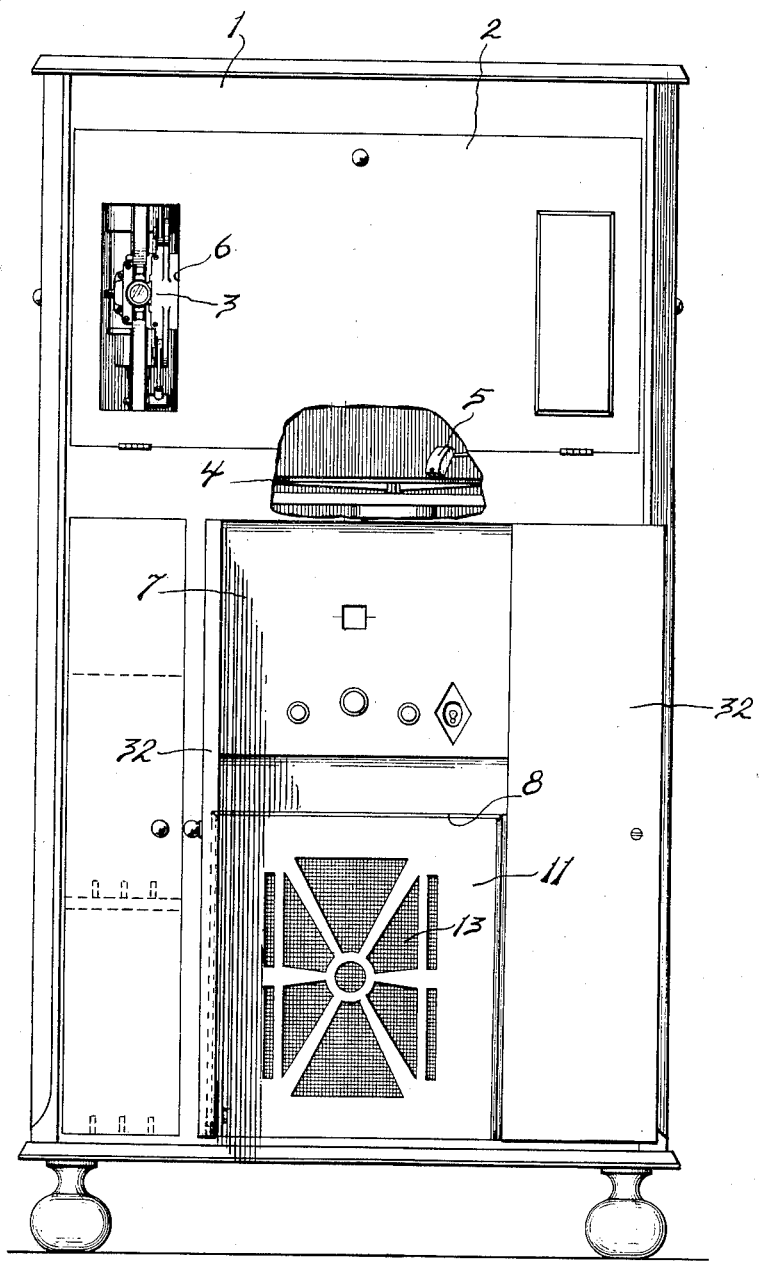
Figure 2 is a front elevation of the cabinet containing the apparatus and having a portion broken away.

Referring to the drawings, 1 designates a cabinet, the upper portion of which is provided with doors 2 for access thereinto and which contains a motion picture projector 3, a phonograph turntable 4 and an associated electric pick up 5, the front door of this upper portion of the cabinet having an opening 6 therein through which pictures from the projector 3 pass, see Figures 1 and 2.

The turntable 4 is driven as usual and when sound accompanied motion pictures are being shown it is driven in synchronism with the projector in a manner unnecessary to be described.

Arranged in the cabinet immediately below the projector and turntable is a radio receiver 7, the low frequency or audio amplifier of which is used as the amplifier of the phonograph as is usual in radio phonograph combinations.

The front of the cabinet is provided with a downwardly disposed opening 8 and receivable in this opening for removal is a reproducer or "loud speaker" unit now to be described.

A rectangular box like carrying structure 9 forming a rearwardly open enclosure is adapted to be received in the opening 8 of the cabinet, and is inclusive of a front panel 11 which occupies the opening 8 of the cabinet when the carrying structure is placed in the cabinet. See Figures 2, 3 and 5.

Mounted within the carrying structure 9 is an electro-responsive sound reproducer or "loud speaker" 12 of the dynamic cone type, and the panel 11 is provided with a sound opening 13 in the form of a conventional grille for said reproducer.

Mounted rearwardly in the enclosure of the carrying structure 9 is a bracket 14 which carries, adjacent its upper end, a headed stud 15 disposed on a transverse axis. See Figures 5 and 6. A carrying reel 16 is revolubly mounted on the stud 15 in the following manner.

Assembly screws 17 of the reel are spaced angularly about the axis of the reel and, passing outwardly from one side of the reel, pass through apertures in a circular member 18 and are screw-threaded into a circular plate 19 which is spaced from the circular member 18 by means of four annular members 21 of insulating material, the screws 17 securing the circular members 18 and 19 and the annular members 21 together and against the adjacent side of the reel in coaxial relation therewith.

The circular members 18 and 19 are coaxially bored and are thereby revolubly engaged on the stud 15 inwardly of the head thereof, whereby the reel is carried for rotation rearwardly on the carrying structure 9, a handle 22 being mounted on the outer flange of the reel for the manual rotation thereof and the adjacent side of the carrying structure 9 being cut away, as designated at 23, to accommodate the rotation of the reel by the handle. The upper side of the structure 9 has a handle 24 formed therein to facilitate carrying of the reel. See Figures 3 and 5.

The reproducer and carrying reel as so carried with the carrying structure 9 are receivable in the opening 8 of the cabinet, with the panel 11 occupying said opening 8, as shown in Figure 2, and being removable from the cabinet as a unit as shown in Figure 1.

A multiple conductor extension energizing cable 25 is provided for connecting the output of the low frequency or audio amplifier of the receiver 7 within the cabinet with the reproducer or "speaker", and this cable is wound on the reel 16 to take care of the surplus cable in the placement of the reproducer unit either within or without the cabinet.

The inner ends of the conductor of the cable 25 are individually secured to inward extensions 26 of slip rings 27 clamped in grooves formed by the shouldering of one side surface of each of the annular members 21 of insulating material, heretofore described, and individually mounted on a block 28 of insulating material, secured on the upper end of the bracket 14, are a plurality of spring contacts 29 each of which frictionally contacts the periphery of a respective slip ring 27. The contacts 29 are individually connected to the leads 30 from the reproducer or speaker, as designated at 31.

Thus, are provided slip ring circuit connections associated with the reel 16, so that circuit connections are maintained with the inner ends of the conductors on the reel, which permit of rotation of the reel.

In placing the reproducer either within or at a desired point outside of the cabinet, the cable 25 is either wound on the reel or unwound therefrom to provide the required extension of the cable, the surplus cable unobtrusively and compactly carried on the reel, and it will be observed that the carrying of the reel with the reproducer is advantageous in that it is at hand for unwinding or winding of the cable while the reproducer is carried to the desired position.

When the reproducer is placed in the cabinet the assembly has the conventional unitary radio receiver and electric phonograph appearance and characteristics, the front of the radio receiver and the reproducer being closed in when desired by doors 32 hinged on the cabinet.

In the production of sound accompanied motion pictures the reproducer unit is removed from the cabinet and placed adjacent a projection screen 33, see Figure 1, spaced from the cabinet so that the sound issues adjacent the screen.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a device of the character described the combination with a cabinet provided with an opening in a vertical side thereof, of a portable electro-responsive sound reproducer, an extension energizing cable for connecting said reproducer with a producer of sound modulated electric energy in said cabinet, said reproducer being adapted to be received in said opening and removable therefrom, and a panel provided with a sound opening for said reproducer and carried therewith and occupying said opening of the cabinet when the reproducer is disposed in the cabinet.

2. In a device of the character described the combination with a cabinet provided with a downwardly disposed opening in the front panel thereof, of a carrying structure forming a rearwardly open enclosure and including a front panel provided with a sound opening, said carrying structure being adapted to be received in said opening of the cabinet with said panel occupying said opening of the cabinet, an electro-responsive sound reproducer carried by said carrying structure within the enclosure thereof and associated with said sound opening, an energizing cable for connecting said reproducer with a producer of sound modulated electric energy in said cabinet, a manually manipulated carrying reel for said cable and carried rearwardly on said carrying structure, and a carrying handle formation at the top of said carrying structure.

JOSEPH H. McNABB.